G. A. LUCAS.
APPARATUS FOR THE BACTERIOLOGICAL TREATMENT OF SEWAGE AND THE LIKE.
APPLICATION FILED MAR. 11, 1907.
936,464.
Patented Oct. 12, 1909.
3 SHEETS—SHEET 1.
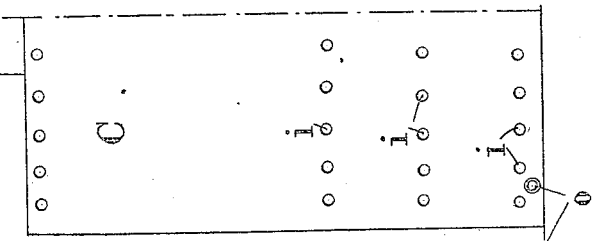
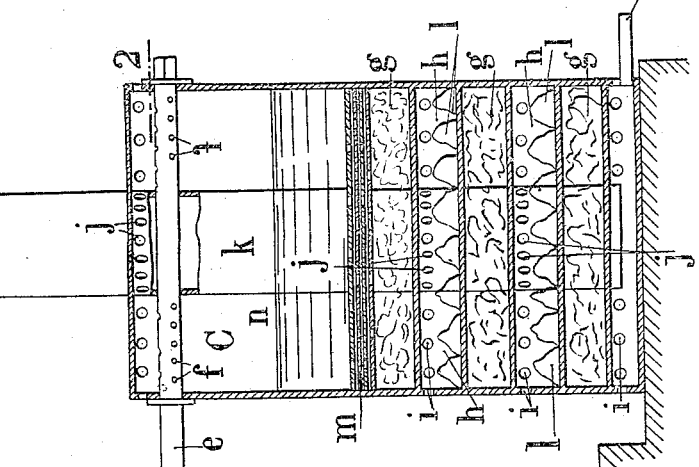
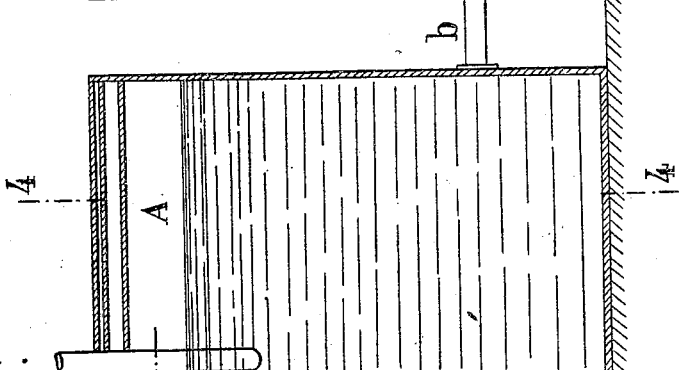
WITNESSES:
W. M. Avery
J. P. Davis
INVENTOR
Gustave Albert Lucas
BY
Munn & Co
ATTORNEYS G. A. LUCAS.
APPARATUS FOR THE BACTERIOLOGICAL TREATMENT OF SEWAGE AND THE LIKE.
APPLICATION FILED MAR. 11, 1907.

936,464.

Patented Oct. 12, 1909.
3 SHEETS—SHEET 2.

WITNESSES:
W. M. Avery
J. P. Davis

INVENTOR
Gustave Albert Lucas
BY
Munn & Co
ATTORNEYS

G. A. LUCAS.
APPARATUS FOR THE BACTERIOLOGICAL TREATMENT OF SEWAGE AND THE LIKE.
APPLICATION FILED MAR. 11, 1907.

936,464.

Patented Oct. 12, 1909.

3 SHEETS—SHEET 3.

WITNESSES
W. M. Avery
J. P. Davis

INVENTOR
Gustave Albert Lucas
BY
Munn & Co
ATTORNEYS

UNITED STATES PATENT OFFICE.

GUSTAVE ALBERT LUCAS, OF LEVALLOIS-PERRET, FRANCE.

APPARATUS FOR THE BACTERIOLOGICAL TREATMENT OF SEWAGE AND THE LIKE.

936,464.   Specification of Letters Patent.   Patented Oct. 12, 1909.

Application filed March 11, 1907. Serial No. 361,735.

*To all whom it may concern:*

Be it known that I, GUSTAVE ALBERT LUCAS, of 75 Rue Voltaire, Levallois-Perret, Seine, Republic of France, mechanical engineer, have invented Improvements in Apparatus for the Bacteriological Treatment of Sewage and the Like, of which the following is a full, clear, and exact description.

My invention is an improvement in apparatus for the bacteriological treatment of sewage and consists in certain novel constructions and combinations of parts hereinafter described and claimed.

The invention is an improvement over my prior patent No. 869,001, granted October 22, 1907, and is designed to treat sewage successively by anaerobic and aerobic fermentation and oxidation.

Figure 2:
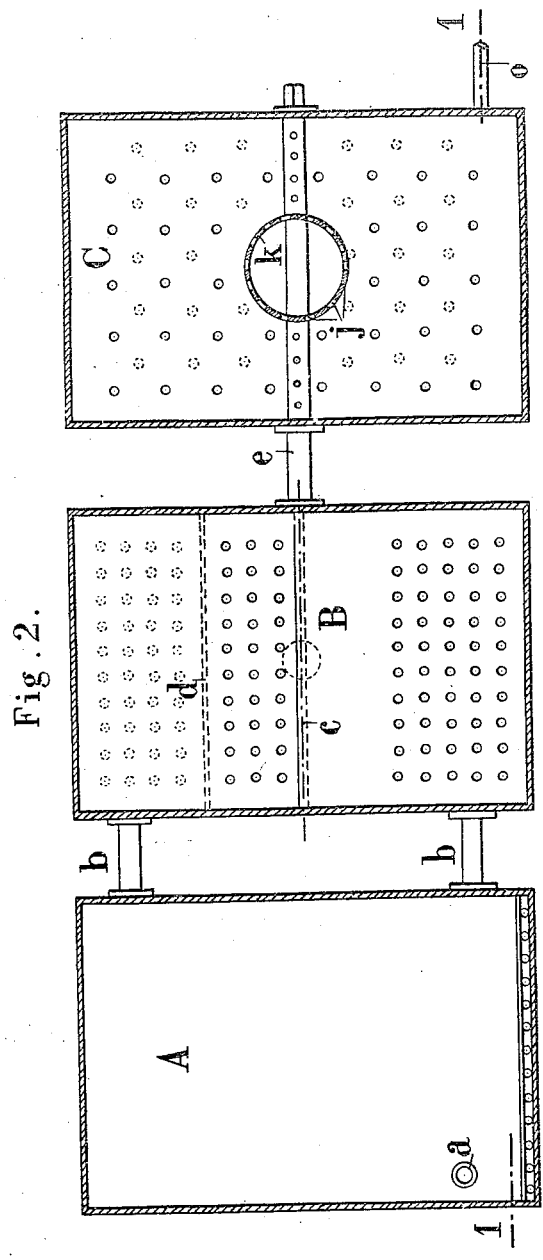
Figure 3:
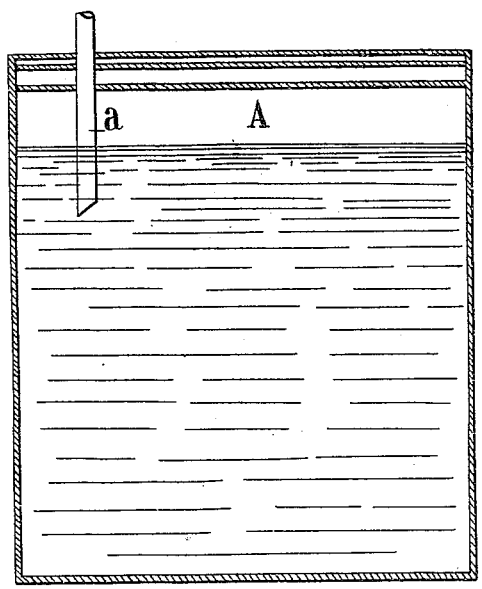
Figure 4:
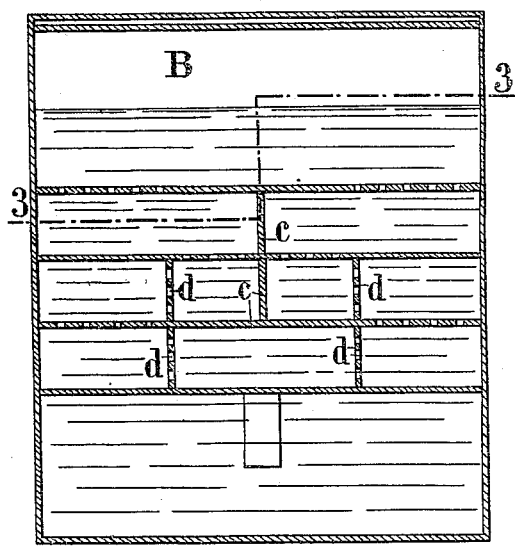

Referring to the drawings forming a part hereof—Figure 1 is a longitudinal section on the line 1—1 of Fig. 2. Fig. 2 is a horizontal section on the line 2—2 of Fig. 1 and on the line 3—3 of Fig. 4. Fig. 3 shows the receiving chamber in transverse vertical section on the line 4—4 of Fig. 1. Fig. 4 is a transverse vertical section of the anaerobic fermentation chamber, the section being on the line 5—5 of Fig. 1. Fig. 5 shows an external view of a part of the bacteriological purifying chamber.

The present embodiment of my invention comprises a receiving chamber A, an anaerobic fermentation chamber B, and an aerobic purifying chamber C.

The receiving chamber A, is completely closed, and contains water to a certain level, the inflow pipe $a$ opening beneath the said level, the sewage being discharged into the water and partially diluted before entering the anaerobic fermentation chamber B, with which chamber, the chamber A is connected by pipes $b$, the said pipes communicating with the chambers near the bottom thereof.

The chamber B is shown and described in my prior patent above mentioned, the chamber being divided into a series of cells by partitions $c$ $d$, of which the partitions $c$ are imperforate, and the others $d$ are perforated, and the partitions are so arranged that an imperforate partition is always opposite a perforated partition. By this arrangement, the bacteria can attach themselves to the imperforate partitions, and can do their work without being carried along or interfered with by the current of liquid which circulates through the perforated partitions. Under these conditions, the anaerobic bacteria can develop freely and do a maximum amount of work, so that the liquid that arrives at the upper part of the chamber B no longer contains organic matter, such matter having been completely destroyed by the anaerobic bacteria. The anaerobic fermentation chamber is connected at its upper portion, to the aerobic purifying chamber C, by a pipe $e$, having orifices $f$ within the purifying chamber, through which the liquid to be treated passes. This chamber C is divided by horizontal partitions into a plurality of compartments, the partitions being perforated or composed of porous material in order to permit the passage of the liquid. The compartments are alternately arranged for filtering and for oxidizing, and for this purpose, some of them, as $g$, are filled with filtering material, and the others $h$, are filled with fresh air, which is constantly renewed. This air enters through the orifices $i$ provided in the walls of the apparatus, circulates in the empty spaces $h$ passes out through the orifices $j$ through a central vertical pipe $k$ and escapes to the atmosphere through the said vertical pipe which acts as a draft chimney. Only one vertical conduit is shown, but it is obvious that others may be made use of.

In order to increase the surface of contact of the matter to be treated with air, the oxidizing compartments $h$ contain small blocks $l$ formed of porous material and of prismatic or conical form.

Above the first filter bed $g$ there is mounted a regulating device consisting of a certain number of perforated flag stones or plates $m$, the holes of the respective plates being staggered so as not to register with each other, in order to retard the speed of the liquid passing therethrough. Above the regulator, a chamber $n$ is arranged in which the liquid arriving from the anaerobic fermentation chamber collects, before its passage through the regulator and the filtering and oxidizing compartments.

At the base of the purifying chamber C, there is arranged an outlet pipe $o$, through which the treated liquid passes. Such liquid at its exit from the chamber C, no longer contains any organic matter, is completely colorless and inodorous, and can be run without any inconvenience into drains or rivers.

The apparatus can be installed in dwelling houses, thus permitting the destruction on the spot and in a complete manner of the organic germs contained in sewage.

The dimensions of each chamber forming my improved apparatus will vary according to the quantity of matter to be treated, and the form and detail will also be varied in accordance with the same condition.

I claim—

An apparatus for the bacteriological treatment of sewage comprising in combination an anaerobical chamber and an oxidation chamber, the latter comprising several filtering beds, empty spaces separating these filtering beds the ones from the others, orifices provided in the vertical walls of the apparatus, at the upper level of each of these empty spaces, a central chimney starting from the bottom of the apparatus, passing through the filtering beds and the empty spaces ending to the atmosphere and having orifices provided at the same level as the preceding orifices.

The foregoing specification of my improvements in apparatus for the bacteriological treatment of fecal matter, domestic waste water, sewage, and the like signed by me this fifth day of February 1907.

GUSTAVE ALBERT LUCAS.

Witnesses:
EDOUARD FLEHINGHAUS,
MAURICE H. PIGUET.